United States Patent [19]

Barbour et al.

[11] Patent Number: 4,910,833
[45] Date of Patent: Mar. 27, 1990

[54] DOUBLE-LOCKING ANCHOR CHAIN TENSIONER

[75] Inventors: Robert G. Barbour, 4238 Coolidge Ave., Mar Vista, Calif. 90066; Glenn A. Smith, Mar Vista, Calif.

[73] Assignee: Robert G. Barbour, Los Angeles, Calif.

[21] Appl. No.: 367,938

[22] Filed: Jun. 19, 1989

[51] Int. Cl.[4] .............................................. A44B 21/00
[52] U.S. Cl. ................................. 24/68 CT; 24/68 CD
[58] Field of Search .......... 24/68 CT, 68 CD, 70 CT, 24/71 CT, 116 R; 70/18, 57

[56] References Cited

U.S. PATENT DOCUMENTS

| | | | |
|---|---|---|---|
| 1,248,724 | 12/1917 | Royer et al. | 24/68 CT |
| 1,619,471 | 3/1927 | Hartung | 24/68 CT |
| 1,636,638 | 7/1927 | Jenkins | 24/68 CT |
| 2,049,710 | 8/1936 | Livingston | 24/116 R |
| 2,298,115 | 10/1942 | Felton et al. | 24/68 CT |
| 3,423,799 | 1/1969 | Higuchi | 24/68 CT |
| 4,199,182 | 4/1980 | Sunesson | 24/68 CD |
| 4,693,097 | 9/1987 | Rivera | 70/18 |

FOREIGN PATENT DOCUMENTS 789992 1/1958 United Kingdom ............. 24/68 CT

OTHER PUBLICATIONS

Deep Seven's SLVI Anchor Tensioner/Lock—Deep Seven Co., one sheet; date Sep. 1988.

Primary Examiner—Victor N. Sakran
Attorney, Agent, or Firm—Poms, Smith, Lande & Rose

[57] ABSTRACT

A simplified anchor chain tensioner includes a base bracket, and a multiple function U-shaped lever pivotally mounted to the base bracket. The anchor chain hook is pivotally mounted by threaded engagement to a pivot pin mounted through the two lever arms of the U-shaped lever. The front ends of the lever arms are resiliently movable toward and away from one another, with the end of one lever arm being notched to resiliently latch and hold down the anchor hook arm; while the end of the other lever arm is jogged to provide a surface for locking engagement with the base bracket and a second surface for the application of manual compression force to release the latching and/or locking action.

17 Claims, 1 Drawing Sheet

DOUBLE-LOCKING ANCHOR CHAIN TENSIONER

FIELD OF THE INVENTION

The present invention relates to an adjustable, double-locking mechanism for tensioning a chain.

BACKGROUND OF THE INVENTION

A common problem at sea is that, unless properly restrained, an anchor tends to wobble and bounce against its mounting bracket when the vessel carrying the anchor is working against waves. This problem is universal, but is of particular concern where the anchor is mounted on a bow pulpit or roller on a small to medium sized boat. Wobbling of the anchor is not, however, the only difficulty.

At sea, the anchor normally remains shackled to its chain. The chain is led over the bow roller, if one is provided, across at least part of the deck, and is stowed in an anchor locker. Unless the chain is tensioned, however, not only will the anchor itself wobble, the chain will slide and beat against the deck and eventually damage it. Accordingly, a tensioning clamp for the anchor chain is commonly installed on deck near the anchor locker. By holding the anchor chain taut, not only is the chain prevented from damaging the deck, the anchor itself is secured firmly against its bracket or roller.

Prior art tensioning clamps typically include a anchor hook, which pivots relative to a lever arm. The hook is provided for grasping one link of the anchor chain. The lever arm is then retracted to pull the anchor hook and link aft. The forward extension of the anchor hook is commonly made adjustable by threading the shaft of the anchor hook, which may then be screwed into or out of a anchor hook pivot shaft mounted transverse the lever arm. In some prior art tensioners, the anchor hook includes a turnbuckle to allow adjustment.

Unless the lever arm of the anchor chain tensioner is locked, it is possible for the anchor chain to raise it and release the anchor chain tension. Consequently, most prior art tensioners provide a locking pin for the lever arm, which extends across and above the handle end of the lever arm and into side walls of a base bracket.

The use of a separate locking pin is a major disadvantage of prior art tensioners. First, if the pin is not captive, it may easily be lost overboard. Second, in order to secure the lever arm, the user must insert the end of the pin through at least one often tight hole while holding the lever arm down. Not only may pin insertion be difficult, it is also dangerous, since both the user's hands are not free to steady him on the pitching, wet deck.

Even if the lever arm is secured, the problem remains that the anchor hook itself may pivot relative to the tensioner deck mounting, and the anchor chain, although more taut, may still slap against the deck as the anchor hook pivots. This problem is particularly pronounced when the chain loads the tensioner at a high angle. The anchor hook, too, should therefore also be positively locked.

The most obvious prior art solution to the problem of locking the anchor hook has been to provide a second locking pin. Of course, this simply compounds the difficulty and danger of properly tensioning the chain.

The SLVI Anchor Tensioner/Lock manufactured by the Deep Seven Co. is a known prior art tensioner which provides double locking without using two pins. Instead, the captive pin used in this device locks both the lever arm and the anchor hook. The lever arm is locked in the conventional manner by inserting one straight end of the pin through holes in a base bracket. The remainder of the pin, however, forms a torsion pin, which extends above and across the hook, then downward, pressing the hook to one side to lessen its freedom to pivot.

The SLVI tensioner suffers, however, from two primary shortcomings. First, it still requires the user to insert a pin through a tight hole at sea. Second, the resilience of the captive torsion pin is not great enough to prevent the hook from pivoting during strong, high-angle loading. Furthermore, this prior art tensioner requires a separate U-bracket for adjustably securing the hook to the hook pivot shaft.

The object of the present invention is to provide an easily adjustable chain tensioner which enables locking and unlocking of both the lever arm and the chain hook in one rapid motion, which is more secure than prior art tensioners, which requires a minimum of parts, and which requires no separate locking pins.

SUMMARY OF THE INVENTION

An anchor chain tensioner includes a U-shaped base bracket and an anchor hook arm coupled together by a multiple purpose, resilient, U-shaped lever. The U-shaped lever is pivoted to the base bracket at the front of the bracket and the anchor hook arm is adjustably coupled to a pivot pin which is mounted somewhat less than half way along the length of the U-shaped lever from the front thereof. The resilient U-shaped lever has a dual locking and latching function, with one end of one arm thereof locking around the adjacent end of the base bracket, and the end of the other arm thereof resiliently engaging the anchor hook arm to restrain its motion.

As a collateral aspect of the invention, the pivot pin for the anchor hook arm may be of a relatively large diameter so that the arm may be threaded through a tapped hole extending through the pivot pin.

The configuration of the U-shaped, resilient lever is of particular interest, as it is reduced in thickness at the closed end thereof to permit bending of the open end thereof to either (a) release the lever by pressing on a finger engagement area extending beyond the bent portion or job in the forward extent of one arm of the U-shaped lever which engages the base bracket, or (b) release the anchor hook arm which is restrained in a notch in the other arm of the U-shaped lever which is inturned at its outer end and which has a vertically extending notch with a laterally extending recess into which the anchor hook arm is resiliently held. Thus, in addition to the basic anchor hook tensioning function of the lever, it has at least two supplemental functions as outlined above, thus simplifying the entire assembly, and reducing manufacturing cost.

DESCRIPTION OF THE DRAWINGS

FIG. 4 is a perspective view of locking portions of a locking clamp; and

DETAILED DESCRIPTION

A specific illustrative embodiment of the present invention will now be described with reference to the figures. For purposes of description only, it is assumed that the present chain tensioner is to be used to secure a bow-mounted anchor by tensioning its anchor chain. Other uses will be pointed out below.

Figure 1:
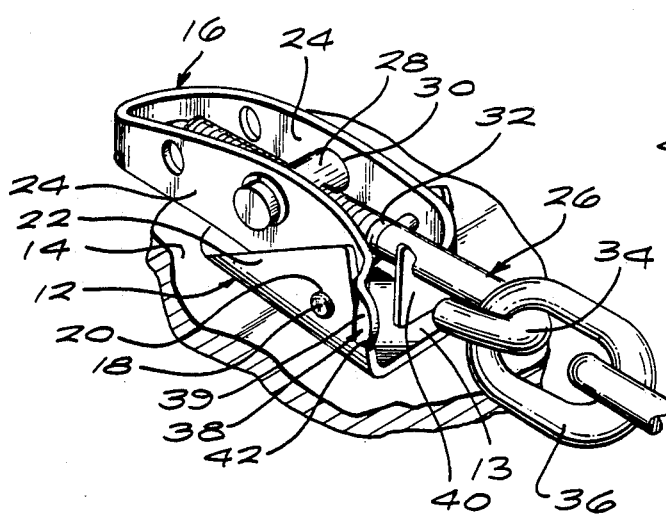
FIG. 1 perspective view of the present chain tensioner in a locked position.

As shown in FIG. 1, the present chain tensioner includes a base bracket 12, with a base plate 13, which is securely fastened in any conventional manner to a deck 14 or other supporting surface. A generally U-shaped locking lever 16 is rotatably mounted on a clamp pivot pin 18, which extends in a transverse direction through holes 20 provided in mainly vertical mounting arms 22 of the base bracket 12. The base bracket is preferably manufactured as a single unit, the mounting arms 22 being simply bent or stamped to form approximately right angles with the base plate 13.

The U-shaped locking clamp lever 16 includes clamp arms 24, which extends mainly parallel in a longitudinal direction and between the mounting arms 22 of the base bracket 12. The locking clamp lever is also a spring member. In an unstressed or minimally stressed locking position, shown in FIG. 1, the distance between the clamp arms 24 is preferably equal to or slightly less than the distance between the mounting arms 22. The clamp arms 24 may, however, be resiliently squeezed toward each other by the manual application of pressure.

A chain hook 26 is secured to a hook pivot pin 28, which extends in the transverse direction through holes 30 provided in the clamp arms 24. A threaded shaft portion 32 of the chain hook 26 is screwed into a correspondingly threaded hole in the hook pivot pin 28. The length by which the chain hook 28 extends from the tensioner can therefore be easily adjusted by screwing the hook into and out of the hook pivot pin 28. At the forwardmost end of the hook is the actual hooked end portion 34, which hooks and holds a selected link 36 of the anchor chain.

Note that by securing the hook directly in the pivot pin, the innermost end of hook may be screwed much farther into the present tensioner than is possible in prior art tensioners which use a separate bracket—in those devices, the pivot pin itself limits the inward extension of the hook. The present tensioner therefore not only eliminates the need for a separate hook bracket, it also provides greater adjustability.

Note also that neither the clamp pivot pin 18 nor the hook pivot pin 28 need ever be withdrawn from any hole in order to use the present tensioner.

At the forward end of the tensioner, i.e. the end at which the chain link 36 is held, a first one of the clamp arms 24 is provided with a clamp locking tab 38. The clamp locking tab 38 is formed by bending or stamping the clamp arm outward, so that it extends mainly transversely, but preferably still somewhat forward, beyond and outside the corresponding mounting arm 22 of the base bracket 12, and then preferably forward again to form a squeezing portion or finger engagement area 42 generally parallel to the mounting arm. The forward end of the other clamp arm is bent or stamped transversely inward to form a hook locking tab 40 The clamp and hook locking tabs are explained in greater detail below.

Figure 2:
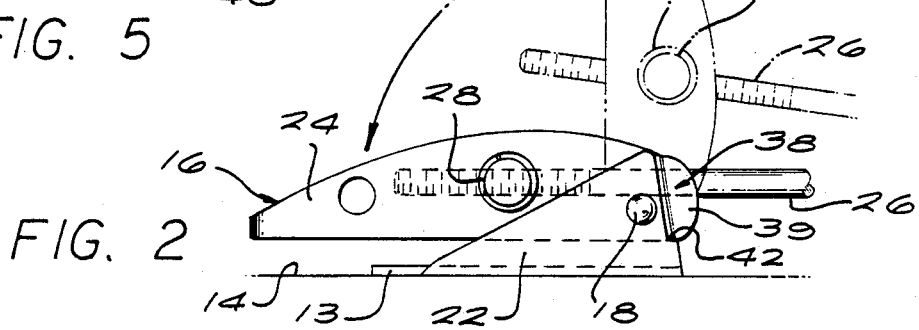
FIG. 2 illustrates the transition of the present chain ten between the locking position and an unlocked position.

FIG. 2 illustrates the two principal operational positions of the present tensioner. In an unlocked position, the locking lever 16 is raised to point mainly upward from the deck 14. In a locked position, the locking clamp 16 extends, as mentioned above, generally in the longitudinal direction, parallel to the deck 14. The tensioner is therefore also shown in the locked position in FIG. 1. The locking clamp moves between the locked and unlocked positions by a rotation about the clamp pivot pin 18. In the unlocked position, the hook pivot pin 28, and consequently the chain hook 26, extend farther forward (in FIG. 2, to the right), than they do in the locked position.

As in the case of prior art tensioning devices, in the unlocked position, the user hooks the hook into a chosen link of the anchor chain. The user then pushes the locking clamp backward and down into the locked position, whereby the hook and chain are drawn aft (in FIG. 2, toward the left), thus tensioning the anchor chain. Since the locking clamp lever 16 preferably extends aft of the hook pivot pin 28, it acts as a lever to provide a mechanical advantage in tensioning the chain. The mechanical advantage may be increased as desired by increasing the aft extension of the locking clamp.

FIG. 2 also shows that the forward edge of the mounting arm 22 adjacent to the clamp locking tab 38 is provided with a ledge portion 42, above which the clamp locking tab rests when the tensioner is in the locked position.

Figure 3:
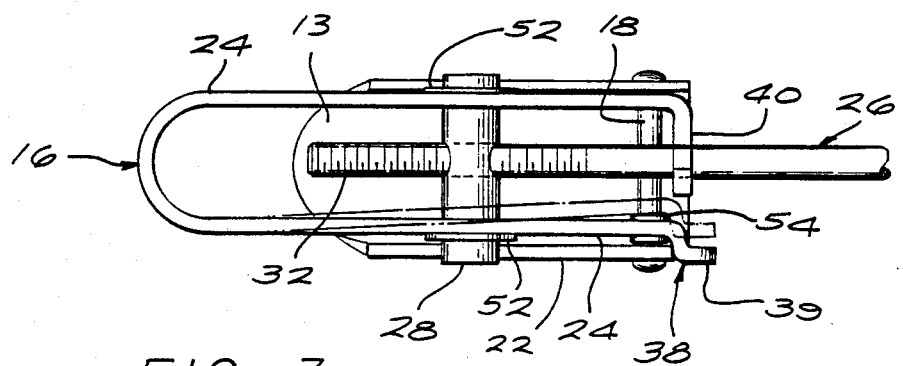
FIG. 3 is a top view of the present chain tensioner, a illustrates a clamp locking motion.

The novel clamp locking action will now be described with reference to FIGS. 2 and 3. When the tensioner is in the unlocked position, the clamp locking tab 38 is forced inward by the corresponding mounting arm 22. The contact force of the mounting arm thus forces the clamp arms toward each other. As the locking clamp is pressed downward into the locked position, the clamp arms snap outward, whereby the clamp locking tab 38 extends over the ledge portion 42. The clamp locking tab 38 and the ledge portion 42 thus form a catch and prevent rotation of the locking clamp out of the locked position.

Figure 5:
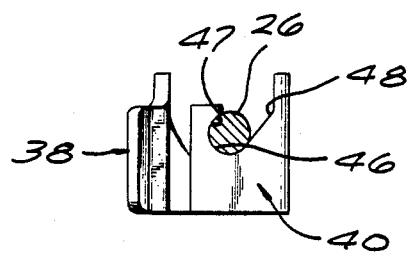
FIG. 5 is a front end view of the locking clamp showing the position of a chain hook when the clamp is in the locked position, and with the pivot pins not shown.

FIGS. 4 and 5 illustrate the clamp locking tab 38 and the hook locking tab 40 in greater detail. In particular, FIG. 4 shows holes 44 made in the clamp arms 24 through which the clamp pivot pin extends. The holes 44 are slightly larger than the outer diameter of the pin 18 so that the arms 24 may be flexed toward one another. The clamp locking tab 38 is described above.

The hook locking tab 40 is provided with a recess 46. In FIG. 5, the shank of the hook arm 26 is shown in section. As seen in FIG. 5, in order for the hook 26 to enter the recess 26, the hook locking tab 40 must move to the left relative to the hook, i.e., toward the clamp locking tab 38. The hook may then snap downward into the recess 46. The spring action of the clamp arms 24, however, biases the clamp arms outward, so that, once the hook rests in the mainly circular inner portion 47 of the recess 46, it will be able to leave it only when a positive force sufficient to overcome the spring action of the locking clamp is applied and forces the clamp arms toward each other. The deeper the mainly circular inner portion 47 of the recess is located relative to the hook shank, the greater will be the force required to release the hook from the hook locking tab 40.

With reference to FIGS. 2 and 5, when the locking clamp 16 is pressed downward into the locked position, the forward tension on the hook from the anchor chain will overcome the spring force of the clamp arms, as a transverse force component of the contact force between the hook 26 and the sloped portion 48 of the recess 46. The hook will therefore snap into the mainly circular recess portion 26 and will be held there by the outwardly directed spring force of the clamp arms 24.

The locking clamp lever will be locked into the locked position by the outward snapping action of the clamp locking tab 38 onto the ledge portion of the mounting arm of the base bracket approximately at the sane time as the hook snaps and is locked into the tab portion 40 of the corresponding clamp arm.

To release the locking clamp lever, the user must squeeze the clamp arms toward each other, thus freeing the locking tab 38 from the ledge portion, and the hook from the recess 46. This may be done by pressing the squeezing portion 39 inward, as is illustrated in FIG. 3, or by squeezing the clamp arms at any other convenient point, for example, aft of the hook pivot pin 28.

Note that it is not necessary for the user to press the locking clamp into the locked position by hand. Once the hook is hooked onto a chain link, the user may steady himself with both hands and may push the clamp downward by stepping on it. Since no pins need be inserted by the user into the present tensioner, using the present invention, the user may tension a chain and lock both the clamp arm and the hook in one quick motion.

In order to improve the security and lifespan of the present tensioner in the highly corrosive sea environment, all of its elements are preferably manufactured of stainless steel. Other metals may, of course also be used.

The present chain tensioner may be used to secure other loads than an anchor. For example, timber loaded on trucks is commonly secured by chains. By mounting several of the chain tensioners according to the present invention along the length of the truck bed, the chains may be tensioned with the same ease as when tensioning an anchor chain as described above.

Instead of the two locking mechanisms shown at the ends of the arms 24, alternative arrangements may be employed. Thus, by way of example and not of limitation, one of the arms 24 could be provided with an outwardly extending pin to mate with a correspondingly positioned hole in one side wall 22, of the base bracket 12. Also, one but not both of the latching and locking functions could be employed, if desired. Accordingly, the present invention is not limited to the structure precisely as shown in the drawings and described in detail hereinabove.

What is claimed is:

1. A simplified dual locking chain tensioner comprising:
   a base bracket having two upstanding arms,
   a resilient U-shaped lever pivotally mounted on said base bracket;
   a chain hook arm pivotally mounted onto said lever and extending in one direction from said base bracket;
   said U-shaped lever having two arms extending forwardly in said one direction, said arms being resiliently biased outwardly and subject to manual inward compression;
   locking means on one of said lever arms for locking engagement with said base bracket; and
   latching means on the other of said lever arms for resilient latching engagement with said chain hook arm;
   whereby said lever performs three functions of (1) applying tensioning force to said chain hook arm, (2) locking said lever to said bracket and (3) resiliently latching said chain hook arm to said lever and therefore to said base bracket.

2. A simplified dual locking chain tensioner as defined in claim 1 wherein said base bracket and said lever are formed of sheet metal.

3. A simplified dual locking chain tensioner as defined in claim 1 wherein said locking means includes an out-turned end of one of said arms of said lever extending in immediate proximity to an end surface of a portion of said bracket.

4. A simplified dual locking chain tensioner as defined in claim 3 wherein said out-turned end of said lever arm has a further extension parallel to the longitudinal extent of said lever, for applying force to compress said lever arms inwardly to release said locking means.

5. A simplified dual locking chain tensioner as defined in claim 1 wherein said latching means includes an in-turned end of one of said arms of said lever, and said inturned end having a vertically extending slot with a laterally extending recess for receiving said chain hook arm.

6. A simplified dual locking chain tensioner as defined in claim wherein said chain hook arm is threaded into a mating threaded hole in a pivot pin extending across between the two arms of said U-shaped lever.

7. A simplified dual locking chain tensioner as defined in claim 1 wherein said lever is formed of sheet metal, and is of relatively greater lateral width at its forward extent in said one direction, and is of relatively lesser width in its rearward extent in the opposite direction to increase the resiliency and bendable qualities of said lever, to facilitate the locking and latching action of the arms of said lever.

8. A simplified dual locking chain tensioner as defined in claim 1 wherein a first pivot pin extends through said lever arms adjacent the ends of said lever arms to mount said lever to said bracket, a second pivot pin extends through said lever arms for coupling to said chain hook arm, and wherein said pins have sufficient tolerance with respect to holes through said lever arms to permit resilient compression of said arms to accomplish the latching and locking functions.

9. A simplified dual locking chain tensioner comprising:
   a base bracket;
   a resilient U-shaped lever pivotally mounted on said base bracket;
   a chain hook arm pivotally mounted onto said lever and extending in one direction from said base bracket;
   said U-shaped lever having two arms extending forwardly in said one direction, said arms being resiliently biased outwardly and subject to manual inward compression;
   locking means on one of said lever arms for locking engagement with said base bracket;
   latching means on the other of said lever arms for resilient latching engagement with said chain hook arm; and
   said locking means including an out-turned end of one of said arms of said lever extending in immediate proximity to an end surface of a portion of said bracket, and
   said out-turned end of said lever arm having a further extension parallel to the longitudinal extent of said lever, for applying force to compress said lever arms inwardly to release said locking means;

whereby said lever performs three functions of (1) applying tensioning force to said chain hook arm, (2) locking said lever to said bracket and (3) resiliently latching said chain hook arm to said lever and therefore to said base bracket.

10. A simplified dual locking chain tensioner as defined in claim 9 wherein said base bracket and said lever are formed of sheet metal.

11. A simplified dual locking chain tensioner as defined in claim 9 wherein said latching means includes an inturned end of one of said arms of said lever, and said inturned end having a vertically extending slot with a laterally extending recess for receiving said chain hook arm.

12. A simplified dual locking chain tensioner as defined in claim 9 wherein said chain hook arm is threaded into a mating threaded hole in a pivot pin extending across between the two arms of said U-shaped lever.

13. A simplified dual locking chain tensioner as defined in claim 9 wherein said lever is formed of sheet metal, and is of relatively greater lateral width at its forward extent in said one direction, and is of relatively lesser width in its rearward extent in the opposite direction to increase the resiliency and bendable qualities of said lever, to facilitate the locking and latching action of the arms of said lever.

14. A simplified dual locking chain tensioner comprising:
 a base bracket;
 a resilient U-shaped lever pivotally mounted on said base bracket;
 a chain hook arm pivotally mounted onto said lever and extending in one direction from said base bracket;
 said U-shaped lever having two arms extending forwardly in said one direction, said arms being resiliently biased outwardly and subject to manual inward compression;
 locking means on one of said lever arms for locking engagement with said base bracket; and
 latching means on the other of said lever arms for resilient latching engagement with said hook arm;
 whereby said lever both applies tensioning force to said chain hook arm, and locks said lever to said bracket.

15. A simplified dual locking chain tensioner as defined in claim 14 wherein said locking means includes an out-turned end of one of said arms of said lever extending in immediate proximity to an end surface of a portion of said bracket.

16. A simplified dual locking chain tensioner as defined in claim 14 wherein said latching means includes an inturned end of one of said arms of said lever, and said inturned end having a vertically extending slot with a laterally extending recess for receiving said chain hook arm.

17. A simplified dual locking chain tensioner as defined in claim 14 wherein said lever is formed of sheet metal, and is of relatively greater lateral width at its forward extent in said one direction, and is of relatively lesser width in its rearward extent in the opposite direction to increase the resiliency and bendable qualities of said lever arms.

* * * * *